Patented June 9, 1936

2,043,932

UNITED STATES PATENT OFFICE 2,043,932

PRODUCTION OF HALOGENATED ORGANIC COMPOUNDS

Arthur Ferdinand August Reynhart, Velsen-Noord, Netherlands, assignor to Shell Development Company, San Francisco, Calif., a corporation of Delaware No Drawing. Application August 5, 1935, Serial No. 34,795. In the Netherlands February 2, 1935

20 Claims. (Cl. 260—166)

This invention relates to a novel process for the production of valuable halogenated organic compounds from unsaturated hydrocarbons by the addition of a halogen to the double bond or bonds thereof.

More particularly, the invention relates to a novel and effective process for effecting the liquid or vapor phase chlorination of unsaturated compounds possessing at least one olefinic linkage between two aliphatic carbon atoms, which comprises reacting such an unsaturated compound with chlorine in the presence of a halogenation catalyst comprising a complex metal cyanide at a temperature at which the addition reaction proceeds at a practical rate while undesirable side reactions which would ordinarily occur to an undesirable extent are substantially obviated.

An object of the invention is to provide a practical and commercially applicable method for the manufacture of saturated polychlorides which possess at least two chlorine atoms, one chlorine atom being linked to each of two vicinal carbon atoms. Of particular value are the products formed by adding a molecule of chlorine to the double bond of an olefine, particularly ethylene and the secondary base olefines. Such products include 1,2-dichlorethane, 1,2-dichlorpropane, 1,2-dichlorbutane, 2,3-dichlorbutane and the like. When diolefines as butadiene are chlorinated, the corresponding tetrachlor-compounds as 1,2,3,4-tetrachlorbutane may be obtained.

Another object of the invention is to provide a practical and highly effective method for the removal and recovery of the olefines from their mixtures with relatively inert substances, particularly when such mixtures have relatively small olefine contents.

The known methods of effecting the chlorination of the olefines to the corresponding valuable chlorinated hydrocarbons have failed to provide an economical and technically feasible process. In the absence of catalysts, and particularly in the vapor phase and when the olefines are present in relatively low concentrations, the reaction proceeds at a prohibitively slow rate, and in addition, besides the desired addition reaction, undesirable substitution reactions occur with the liberation of HCl and formation of useless higher chlorinated products. Catalysts have been proposed for accelerating the reaction. However, the results attendant on the use of the halogenation catalysts hitherto proposed have been very unsatisfactory due to the fact that said catalysts accelerate both desirable and undesirable reactions and, in many cases the percentage of the undesired substitution products surpasses that of the product of addition. Further, the catalysts hitherto used are, in many cases, relatively unstable and subject to rapid degeneration accompanied by a loss in activity.

Now, I have found a specific and highly effective catalyst for the addition reaction, which catalyst appears to accelerate substantially only the desired addition reaction while suppressing undesirable side reactions. By the use of my catalyst and catalyst compositions, the halogenation of unsaturated compounds of the types herein described is brought within the field of practical utility.

The catalyst employed in the execution of my invention essentially comprises one or a plurality of complex cyanides containing one or more metals embraced by Groups 1, 2, 3, and 8 of the periodic system. The complex metal cyanides of the alkaline and alkaline earth metals with the metals as nickel, iron, cobalt, zinc, copper, cadmium, aluminum, magnesium and the like, as well as complex cyanides comprising only one metal selected from the latter group, are particularly suitable catalysts which may be employed severally or in combination with each other and/or other suitable substances. A particularly suitable group of complex metal cyanides includes sodium ferricyanide, sodium ferrocyanide, potassium ferricyanide, calcium ferrocyanide, cobalt ferricyanide, cobalt ferrocyanide, sodium nickel cyanide, potassium nickel cyanide, cadmium ferrocyanide, potassium cadmium cyanide, copper ferrocyanide, potassium cuprocyanide, cupro-cupricyanide, ferri-ferrocyanide, ferro-ferricyanide, potassium zinc cyanide and the like.

In many cases, more efficacious results may be obtained by employing a catalyst mass comprising one or more complex metal cyanides with one or more metal halides. For example, in effecting the chlorination reaction, the activity of a complex metal cyanide may be increased by incorporating therewith one or more metal chlorides as antimony chloride, aluminum chloride, potassium chloride, ferric chloride, nickel chloride, sodium chloride, zinc chloride, cobalt chloride, barium chloride, chromic chloride, calcium chloride, etc.

If desired the catalyst may be supported on a suitable carrier as pumice, calcium carbonate, silica gel, asbestos, kieselguhr, charcoal and the like. The catalytic activity of a selected catalyst or catalyst composition may, in some cases, be considerably enhanced by incorporating therewith a small amount of a substance capable of acting as a promoter.

The particular catalyst or catalyst composition to be employed may be prepared in a variety of suitable manners. A single complex metal cyanide may be used per se or mixed in the dry state with another metal cyanide, metal chloride, etc. In general, I prefer to prepare the catalyst mixtures by dissolving the various components in water and concentrating the solution by distillation, evaporation or the like means. It is pointed out that during the removal of the water as by evaporation, reactions may occur between the metal complex cyanides and the metal halides, if the latter are present, resulting in the formation of complex poly-salts. For example, when concentrating a solution comprising $K_4Fe(CN)_6$ and $AlCl_3$, a double decomposition occurs resulting in the formation of KCl and the double salt $KAlFe(CN)_6$. The catalytic material, in a dry or substantially dry condition is employed in the customary manners in any convenient form as powder, pellets, granules, supported on a carrier, etc.

The invention is broadly applicable to the halogenation of unsaturated compounds containing at least one olefinic or acetylenic linkage between two aliphatic carbon atoms. The same is particularly applicable to the halogenation of olefines. The term "olefine" as used herein and in the appended claims is intended to include those unsaturated compounds possessing one or a plurality of olefinic linkage between two aliphatic carbon atoms. Particularly suitable olefines are ethylene and the secondary base mono-olefines as propylene, $\alpha$-butylene, $\beta$-butylene, $\alpha$-amylene, $\beta$-amylene, $\alpha$-isoamylene and the like as well as their homologues, analogues and suitable substitution products. A suitable olefine may or may not be linked to a cyclic radical as of the aromatic, alicyclic and heterocyclic series, or the olefine may comprise an alicyclic structure. For example, unsaturated compounds as the phenyl and naphthyl ethylenes, propylenes, etc. are contemplated.

The olefines, regardless of their origin, may be applied severally or mixtures comprising a plurality of species may be treated and mixed products obtained. An olefine or a mixture of olefines may be halogenated in the presence of relatively inert substances as paraffins, aromatics, oils, etc. as well as inert gaseous materials as $N_2$, $CO_2$, etc. For example, mixtures of olefines and paraffin hydrocarbons may be treated without separating the olefine or olefines therefrom. Such mixtures may be obtained by the pyrogenesis or cracking of petroleum or shale oils and petroleum products, and by the destructive distillation of coal, peat, pitches, asphalts and related carbonaceous materials.

In utilizing cracked petroleum and petroleum product distillates it may be advantageous to fractionate the same into fractions containing hydrocarbons which, for the most part, contain the same number of carbon atoms to the molecule. Typical fractions of this sort are the ethane-ethylene cut, the propane-propylene cut, etc. If desired, the olefines or a particular olefine may be separated from such a cut or the original mixture by fractionation, condensation, extraction and the like means provided said olefine is not present in prohibitively small amount.

My process provides a means of recovering the olefine content of gases which are so dilute as to render separation of the olefines by the known methods impractical. For the manufacture of dichlorethane and dichlorpropane, the ethylene-containing fraction, obtained by the low temperature fractionation of coke furnace gas, which usually contains from about 12% to 13% ethylene and about 1% to 1.5% propylene, can be employed per se with excellent results.

In the execution of my invention, it is generally desirable that the reaction occur in the presence of small amounts of water vapor. Although, the reaction may be effected in the total absence of warte, I have found that the catalyst generally is less active and shorter lived. During the occurrence of the halogenation, water may be introduced into the reaction zone in a variety of suitable manners. For example, water vapor may be introduced alone or in admixture with one or more of the reactants. When a gaseous hydrocarbon is halogenated, the same may be bubbled through water or mixed with steam prior to its introduction into the reaction zone.

The reaction may be executed in the liquid, vapor or liquid vapor phase. When the lower olefines, particularly the normally gaseous olefines, are chlorinated in accordance with my invention the same is preferably executed in the gaseous phase. The unsaturated compounds to be halogenated, either alone or in the presence of an inert substance, are mixed, prior to or during their introduction into the reaction chamber, with the halogen, preferably in the gaseous state. Generally, I prefer to employ an amount of halogen not in excess of that theoretically required to react with all of the olefine present by addition. The presence of a great excess of halogen is generally to be avoided, since the formation of undesirable higher halogenated products may be difficult to avoid. In some cases, particularly when the halogen is employed in excess, it is desirable to abruptly cool the reaction mixture on its issuance from the reaction zone to prevent further reaction. When all of the olefines are not reacted on one passage through the reaction zone, as is frequently the case when an insufficient quantity of halogen is employed, the reaction products may be separated from the effluent material by any suitable means as condensation at low temperatures, extraction with a suitable solvent, by absorption on an absorptive material as charcoal, silica gel, etc., and the like and the unreacted materials reutilized in the same or another reaction stage. The reaction products may be recovered from the condensate or absorptive material, and separated from each other if a mixture is formed, by any suitable means as distillation, extraction, etc.

The halogen addition reaction is exothermic and a considerable amount of heat is liberated during the reaction. To prevent an excessively high reaction temperature due to the liberated heat, it is necessary, in many cases, to provide cooling or other suitable means of maintaining the temperature substantially constant. By resorting to a proper method of distributing the reaction mixture throughout the catalyst bed, the whole may be kept at a substantially uniform temperature without application of external heat. Furthermore, when vapor phase methods are employed, the space velocity and extent of dilution of the reactants may be adjusted so that the diluent material carries away a large part of the liberated heat. If desired, the temperature of the reaction zone may be controlled by heat exchangers which may be internally or externally applied.

The invention may be executed at any suitable pressure. Preferably, I employ atmospheric or superatmospheric pressures. Elevated pressures generally favor the reaction and are of particular advantage when gaseous mixtures of low olefine content are treated. Pressures of from atmospheric to about 3 atmospheres and higher may be employed.

The halogenation may be effected at any desirable temperature. The same is preferably effected at temperatures of from about 20° C. to about 250° C. Higher and lower temperatures may be used in some cases but in general temperatures much in excess of 250° C. are to be avoided due to the occurrence of polymerization, condensation and substitution reactions resulting in decreased yield. A material advantage inherent in my invention, which distinguishes it from known processes, resides in the fact that the same may be advantageously executed at relatively much higher temperatures. The known processes require temperatures not generally exceeding about 100° C. if excessive deterioration of the product is to be avoided. I may advantageously execute my invention at temperatures of from 200° C. to about 250° C. without detrimentally affecting the life and activity of the catalyst while substantially avoiding undesirable substitution reactions.

Some of the catalysts and catalyst compositions employed in accordance with my invention do not attain their maximum activity until they have been in use for a certain period of time. This induction period is due to a change which occurs in the catalyst mass. The mechanism of this change is not at present fully understood. It is assumed that a partial replacement of the CN groups of the complex cyanide by the halogen may occur. These catalysts which are formed by use are within the scope of the invention in that they comprise one or more complex metal cyanides.

When the invention is executed in the vapor phase, condensation of small amounts of the reaction products on the surface of the catalyst mass may cause the latter to conglomerate and obstruct the flow of the gas or cause channeling and thus decreasing the throughput rate of the mixture of reactants. This condensation on the catalyst surfaces and the attendant difficulties may be substantially obviated by thoroughly drying the catalyst mass prior to its use and preheating the same.

The following specific examples are introduced for the purpose of illustrating suitable modes of executing the invention. It is to be understood that it is not my intention to limit the same to the specific catalysts and reactants employed nor to the condition of operation described.

Example I

The catalyst was prepared by mixing an aqueous solution of potassium ferrocyanide with an aqueous solution containing aluminum chloride and ferric chloride and evaporating the solution to dryness.

The substantially dry residue was broken into pellets having an average diameter of from about 3 mm. to 4 mm. About 4 kilograms of the catalyst pellets were packed into a cylindrical iron reaction vessel having an inside diameter of about 10 cm. and a heating length of about 55 cm. (capacity about 4.3 liters).

A gaseous mixture obtained by effecting the low temperature fractionation of coke oven gas and containing about 12.4% ethylene, 1.4% propylene and about 73% methane and for the rest consisting mainly of hydrogen, carbon monoxide and nitrogen was passed through a wetting chamber and then into contact with the catalyst at a rate of about 1800 liters per hour. Simultaneously chlorine gas was introduced into the inlet of the reaction chamber at a rate of about 200 liters per hour.

No external heating was required. The temperature of the catalyst mass was maintained by the exothermicity of the reaction. The gaseous mixture entered the reaction tube at a temperature of about 15° C. and the temperature of the contact mass measured ⅓ and ⅔ of the distance from the inlet was about 80° C. and about 135° C. respectively.

The gaseous mixture leaving the reaction zone was passed into a condenser and cooled to a temperature of about −5° C. to effect separation of the reaction products from the permanent gases. The condensate was fractionated for separation and recovery of the reaction products. Substantially no higher chlorinated products were formed indicating that substantially no substitution occurred. The first cut which boiled at about 85° C. comprised about 90% of the total distillate and contained substantially only 1,2-dichlorethane. The remaining condensate which distilled above 85° C. consisted for the most part of 1,2-dichlorpropane.

A total of about 90 cu. meters of the ethylene-containing gas mixture and about 32.2 kilos chlorine were reacted to yield about 43.2 kilos of reaction product. The treated gaseous mixture still contained about 3.3% of the olefines. Of the 90 cu. meters of gas treated, 9.78 cu. meters of olefines were reacted. Theoretically, assuming an ethylene to propylene ratio of 9:1, 9.78 cu. meters of the olefines should yield 43.9 kilos of dichlorides. Calculated on the olefines consumed a substantially quantitative yield of the desired products was obtained.

Example II

A complex metal cyanide-metal chloride catalyst was prepared by evaporating an aqueous solution containing equimolecular amounts of potassium cuprocyanide, ferric chloride and aluminum chloride. The substantially dry residue was broken into pellets and about 22 to about 23 cc. of it packed in a suitable reaction tube.

The same ethylene-containing gas as described in Example I was bubbled through water for the absorption of water vapor, mixed with an amount of chlorine substantially equal to the amount theoretically required to react with all of the olefines present, and the gaseous mixture passed over the catalyst at a space velocity of about 800. At this space velocity the catalyst was maintained at a desirable temperature and the chlorine addition reaction was substantially complete on one passage of the gas mixture through the reaction zone.

The gaseous mixture issuing from the reaction tube was cooled to a low temperature to condense the reaction products and effect their separation from the permanent gases.

Calculated on the olefines passed through the reaction zone, a substantially quantitative yield of 1,2-dichlorethane and 1,2-dichlorpropane was obtained. Virtually no substitution took place as evidenced by the fact that only traces of HCl and no higher substituted products were obtained. The small amount of HCl formed was probably due to reaction of Cl₂ with the water vapor and/or hydrogen present in the gaseous mixture.

The term "spaced velocity" as used herein is defined as a unit volume of the gaseous reaction mixture, measured at standard conditions of temperature and pressure, contacted with a unit volume of catalyst per hour.

The space velocity to be employed is dependent upon the particular halogen addition reaction catalyzed, upon the extent of dilution of the reactants in the treated mixture, upon the reaction temperature desired and upon the particular catalyst or catalyst composition employed. If in the latter specific example, the potassium cuprocyanide in the catalyst mass is replaced by potassium zinc-cyanide, sodium ferrocyanide or cupri-cuprocyanide desirable active and selective chlorine-addition catalysts are also obtained and excellent results are attendant on their use; however, to obtain virtually the same degree of conversion per pass, relatively lower space velocities should be used. The same also applies to the use of a catalyst mass comprising potassium cuprocyanide, ferric chloride and potassium chloride.

Although the invention has been described with particular reference to the chlorination of olefines, it is to be understood that the same is applicable to the halogenation of other unsaturated organic compounds and that halogens other than chlorine may be used.

It will be evident to those skilled in the art that the invention may be executed in a batch, intermittent or continuous manner.

The halogenated organic products prepared by method are valuable for a wide variety of purposes. The dichlorides prepared by the addition of chlorine to the double bond of mono-olefines are useful as solvents and components of solvent compositions, lacquers, insecticides, fungicides and the like. In addition, they are valuable intermediates in the preparation of a wide variety of useful compounds as glycols, ethers, esters, acids, aldehydes, ketones, nitriles and the like.

While I have described my invention in a detailed manner and provided specific examples illustrating suitable modes of executing the same, it is to be understood that modifications may be made and that no limitations other than those imposed by the scope of the appended claims are intended.

I claim as my invention:

1. A process for the production of valuable halogen addition products of unsaturated organic compounds which comprises reacting an unsaturated organic compound wherein the unsaturation is between two aliphatic carbon atoms with a halogen in the presence of a halogenation catalyst essentially comprising a complex metal cyanide.

2. A process for the production of valuable halogen addition products of unsaturated organic compounds which comprises reacting an unsaturated organic compound wherein the unsaturation is between two aliphatic carbon atoms with a halogen in the presence of a halogenation catalyst essentially comprising a complex metal cyanide and a metal halide.

3. A process for the production of valuable halogen addition products of unsaturated organic compounds which comprises reacting an organic compound possessing at least one olefinic linkage between two aliphatic carbon atoms with a halogen in the presence of a halogenation catalyst essentially comprising a complex metal cyanide at a temperature at which the addition reaction occurs at a practical rate while substitution which would ordinarily occur to an undesirable extent is substantially obviated.

4. A process for the production of valuable halogen addition products of olefines which comprises reacting an olefine with a halogen in the presence of a halogenation catalyst essentially comprising a complex metal cyanide at a temperature at which the addition reaction occurs at a practical rate while substitution reactions which would ordinarily occur to an undesirable extent are substantially obviated.

5. A process for the production of valuable halogen addition products of olefines which comprises reacting an olefine with a halogen in the presence of a halogenation catalyst essentially comprising a complex metal cyanide at a temperature of from about 20° C. to about 250 C.

6. A process for the production of valuable halogen addition products of olefines which comprises reacting an olefine with a halogen in the presence of a halogenation catalyst essentially comprising a complex metal cyanide at a temperature of from about 20° C. to about 250° C. and under a superatmospheric pressure.

7. A process for the production of valuable halogen addition products of olefines which comprises reacting an olefine in the presence of a relatively small amount of water with an amount of a halogen not substantially in excess of an amount theoretically required to completely react with the olefine by addition, said reaction being effected in the presence of a halogenation catalyst essentially comprising a complex metal cyanide at a temperature of from about 20° C. to about 250° C.

8. A process for the production of valuable halogen addition products of olefines which comprises contacting a mixture containing an olefine and a relatively inert material with a halogen and passing the mixture into contact with a halogenation catalyst essentially comprising a complex metal cyanide at a temperature of from about 20° C. to about 250° C.

9. A process for the production of valuable chlorine addition products of olefines which comprises reacting an olefine with chlorine in the presence of a halogenation catalyst essentially comprising a complex metal cyanide at a temperature of from about 20° C. to about 250° C.

10. A process for the production of valuable chlorine addition products of olefines which comprises reacting an olefine with chlorine in the presence of essentially a complex cyanide of metals of groups 1, 2, 3 and 8 of the periodic system at a temperature of from about 20° C. to about 250° C.

11. A process for the production of valuable chlorine addition products of olefines which comprises reacting an olefine with chlorine in the presence of a halogenation catalyst essentially comprising a complex metal cyanide and a metal chloride at a temperature of from about 20° C. to about 250° C.

12. A process for the production of valuable chlorine addition products of olefines which comprises effecting the vapor phase reaction of an olefine with chlorine in the presence of a halogenation catlyst essentially comprising a complex metal cyanide at a temperature of from about 20° C. to about 250° C.

13. A process for the production of valuable chlorine addition products of olefines which comprises effecting the vapor phase reaction of an olefine with chlorine in the presence of a relatively small amount of water vapor and in the presence of a halogenation catalyst essentially comprising a complex metal cyanide at a temperature of from about 20° C. to about 250° C.

14. A process for the production of valuable chlorine addition products of mono-olefines which comprises adding to a mono-olefine not more than an equimolecular amount of chlorine and passing the mixture in the gaseous phase into contact with a halogenation catalyst essentially comprising a complex metal cyanide at a temperature of from about 20° C. to about 250° C. and under a superatmospheric pressure.

15. A process for the production of valuable chlorine addition products of olefines which comprises contacting an olefine of the class consisting of ethylene and secondary base mono-olefines with chlorine and passing the mixture into contact with a halogenation catalyst essentially comprising a complex metal cyanide at a temperature of from about 20° C. to about 250° C.

16. A process for the production of 1,2-dichlorethane which comprises reacting ethylene with chlorine in the gaseous phase in the presence of a halogenation catalyst essentially comprising a complex metal cyanide at a temperature of from about 20° C. to about 250° C.

17. A process for the recovery of the olefine content of a mixture containing an olefine and a relatively larger amount of a relatively inert material which comprises adding thereto an amount of chlorine substantially equivalent to its olefine content and passing the mixture into contact with a catalyst essentially comprising a complex metal cyanide at a temperature of from about 20° C. to about 250° C.

18. A process for the recovery of the olefine content of a mixture comprising a paraffin hydrocarbon and a relatively small amount of an olefine which comprises adding thereto an amount of chlorine not substantially greater than the amount theoretically required to combine with the olefine content of the treated material and passing the mixture into contact with a catalyst essentially comprising a complex metal cyanide at a temperature of from about 20° C. to about 250° C., and recovering the chlorine addition product.

19. A process for the recovery of the olefine content of a gaseous mixture comprising a paraffin hydrocarbon and a relatively small amount of an olefine which comprises adding gaseous chlorine thereto and passing the gaseous mixture into contact with a catalyst essentially comprising a complex metal cyanide and a metal chloride at a temperature of from about 20° C. to about 250° C., cooling the treated material to separate the reaction product from the permanent gases, and recovering the reaction product from the condensate.

20. A process for the production of 1,2-dichlorethane which comprises mixing a gas consisting for the most part of methane and ethylene and containing from about 11% to 12% by volume of ethylene with an amount of chlorine gas substantially equivalent to the olefine content of the gas and passing the gaseous mixture into contact with a catalyst essentially comprising potassium ferrocyanide, ferric chloride and aluminum chloride at a temperature of from about 20° C. to about 250° C.

ARTHUR FERDINAND
AUGUST REYNHART.